Nov. 22, 1949  A. H. DE MOSS  2,488,766
PROGRAM CONTROLLER
Filed Nov. 20, 1943  2 Sheets-Sheet 1
FIG. 1
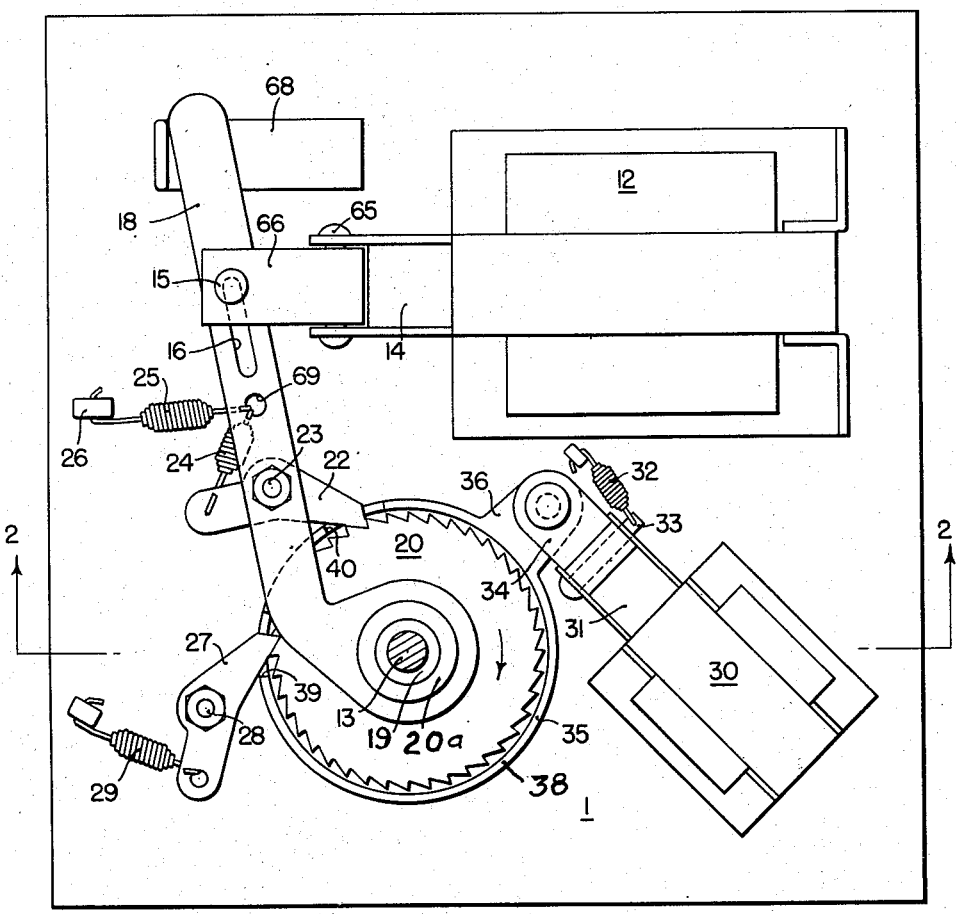
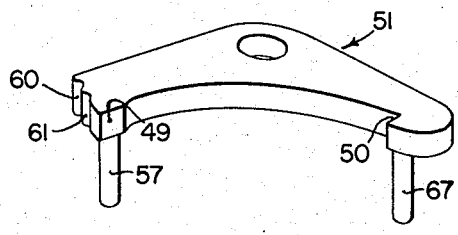
FIG. 5
INVENTOR.
ALBERT H. De MOSS
BY Bruno C. Lechler
ATTORNEY Nov. 22, 1949   A. H. DE MOSS   2,488,766
PROGRAM CONTROLLER
Filed Nov. 20, 1943   2 Sheets-Sheet 2

INVENTOR.
ALBERT H. DE MOSS
BY Bruno C. Lechler
ATTORNEY

Patented Nov. 22, 1949

2,488,766

UNITED STATES PATENT OFFICE 2,488,766

PROGRAM CONTROLLER

Albert H. De Moss, Moline, Ill., assignor to American Machine & Metals, Inc., Moline, Ill., a corporation of Delaware Application November 20, 1943, Serial No. 511,068

3 Claims. (Cl. 74—142)

1

The present invention relates to improvements in program controllers.

The particular program controller chosen for illustration is useful in the performance of certain operations involved in the washing of clothes. Such program controllers frequently are used to control the performance of a number of operations in proper succession, such as the opening and closing of valves at the proper time, filling containers to specified depths at the proper time, controlling temperatures at certain stages of the washing process, controlling the admixture of the ingredients, controlling the discharge of part of the contents of the containers, and the operation of a driving motor. Frequently a washing process consists of several stages, each stage comprising a number of grouped steps. It is frequently desirable to repeat one or more of said stages before proceeding to the next stage of the process.

The present invention relates to program controllers involving step-by-step mechanism which by means of electrical contact members, cams, or other instrumentalities, may control electrical circuits, air responsive means, or other control means for accomplishing the operations desired.

An object of the present invention is to provide an improved controller which is movable forward step by step throughout a plurality of stages, said controller having means to return it to the beginning of any particular stage, permitting the controller to repeat the steps included in that stage.

A further object is to provide a controller for carrying through a process having several stages, any of which may be repeated either once or a plurality of times at the option of the operator.

A further object is to provide a controller movable forward step by step, said controller having means to move it in the reverse direction during any stage for the repetition of that stage.

A further object is to provide an improved program controller of the drum type which can carry through a predetermined program of stages of operation, any one or more of which stages can be repeated at the option of the operator.

Further objects will appear as the description proceeds.

Though the present invention will be described in connection with commercial laundry operations, it will be understood that the invention is not limited to that particular industrial field but has a much broader application.

Referring particularly to the operation of a laundry washer, it is necessary to control at

2 properly related time intervals the admission into the washer of hot water, cold water, soap, alkali, steam, bluing, and other materials, and to control the temperature, the agitation and the discharge of liquids. Liquid levels must be maintained, which levels vary during various stages of the washing process. The clothes may be treated to one or to successive treatments with detergents, followed by other treatments such as bleaching and rinsing. These treatments vary, depending upon the degree of soil in different batches of clothes to be cleaned. According to the present invention any of these treatments may be repeated one or more times.

Referring to the drawings—

Figure 1 is a sectional view taken along the plane indicated by the arrows 1—1 of Figure 2;

Figure 5 is a perspective view of an escapement pawl forming part of the disclosure of Figures 2 and 3.

Figure 2:
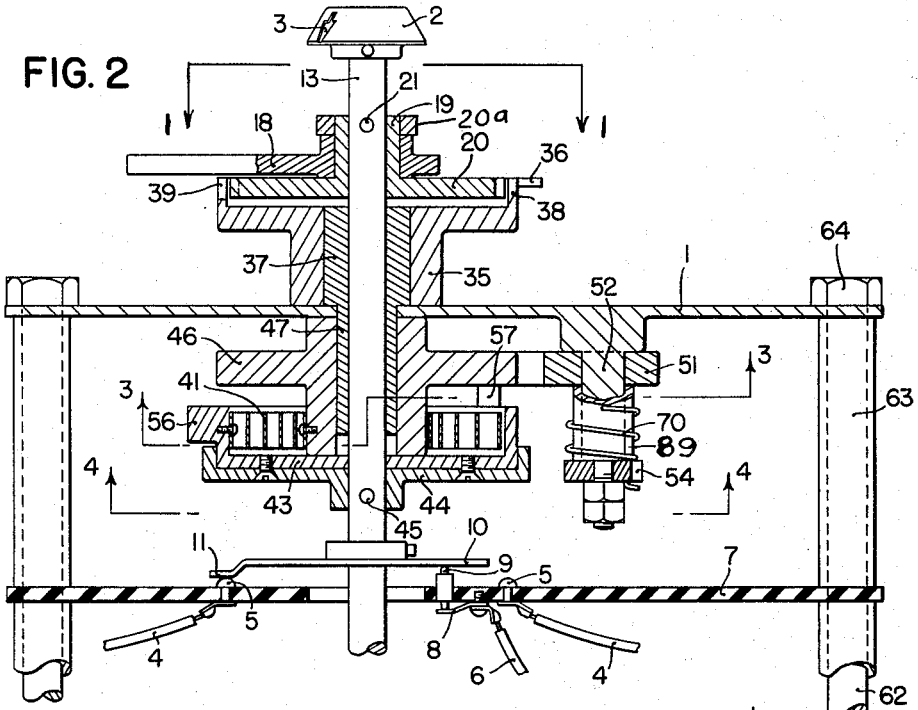
Figure 2 is a vertical section taken along the plane indicated by the arrows 2—2 of Figure 1.

The numeral 1 indicates a chassis. This chassis may be supported conveniently with reference to a machine to be controlled, a knob 2 being provided having an indicating pointer 3 which may indicate on a circular scale (not shown) the particular stage of a washing operation or the like which happens to be controlled by the controller at any particular moment.

The numerals 4—4 indicate electrical conductors leading to contactors 5—5. The numeral 6 indicates a conductor, the contacts 5—5 and the conductor 6 being secured to an insulating plate 7. Said conductor 6 is provided with a resilient terminal 8 adapted to press against a pin 9 which engages a rotatable conducting disk 10. The contacts 5—5 are arranged in a circle and are adapted to be engaged in succession by the spring finger 11, which forms a part of the disk 10.

The numeral 12 indicates a solenoid which, through instrumentalities to be described presently, has the function of communicating a step-by-step rotary movement to the shaft 13. Said solenoid 12 is provided with the armature 14 for operating the pin 15 mounted in the slot 16 in the lever 18, which has its axis of swing disposed coincidentally with the axis of the shaft 13.

The numeral 19 indicates an upstanding annular collar upon the ratchet plate 20. Encircling the collar 19 is the collar 20a. Said ratchet plate 20 and its collars 19 and 20a are secured to the shaft 13 by means of the pin 21. Said ratchet plate 20 and said collar 20a hold the lever 18 against axial movement. The numeral 22 indicates an actuating pawl swingingly mounted upon the stud 23 carried by the lever 18. Said pawl 22 at one end is adapted to have a ratcheting engagement with the ratchet plate 20. A spring 24 connects the other end of the pawl 22 to the lever 18 at 69. Said lever 18, as the parts are viewed in Figure 1, is biased in a counterclockwise direction by the spring 25, one end of said spring 25 being secured to said lever 18 at 69, the other end being secured to the abutment 26 fast with the chassis 1.

The numeral 27 indicates a detent pawl swung about the pin 28 carried by the chassis 1. One end of said detent pawl 27 is adapted to engage the ratchet plate 20. The other end of said pawl is engaged by one end of the spring 29, the other end of which is anchored with reference to the chassis 1.

The numeral 30 indicates a resetting solenoid. Said solenoid 30 is provided with the armature 31. A spring 32 is provided which engages a pin 33 secured to the armature 31 to bias said armature 31 in a position outwardly of the solenoid 30.

Carried by the pin 33 is a link 34 adapted to exert a pull upon the oscillating ring 35, which is provided with the arm 36 engaged by said link 34. As the parts are viewed in Figure 1, energization of the solenoid 30 will move the oscillating ring 35 in a clockwise direction. Said oscillating ring 35 rocks freely upon a stud 37 fast with the chassis 1. Said oscillating ring 35 is provided with the upstanding annular wall 38 which encloses the ratchet plate 20. Said upstanding wall 38 is provided with a pair of apertures through which the pawls 27 and 22 extend. One of said apertures is bounded by the edge 39 and the other is bounded by the edge 40 (Fig. 1). Said edge 39, when the oscillating ring 35 is moved in a clockwise direction (Fig. 1), will move the detent pawl 27 out of engagement with the teeth of the ratchet plate 20. In the same movement the edge 40 will move the actuating pawl 22 out of engagement with the teeth of ratchet plate 20.

The numeral 41 (Figs. 2 and 3) represent a coil spring, one terminal of which is connected through the screw 42 to the inner wall of the cup 43. Said cup 43 is secured to the ratchet disk 44, which by means of the pin 45 is secured to the shaft 13.

The numeral 46 indicates a control disk rotatably mounted upon the downwardly extending portion 47 of the stud 37. Disposed at the periphery of the control disk 47 is the finger 48 adapted selectably to engage the faces 49 and 50 of the escapement pawl 51 oscillatably carried by the pin 52 fast with the chassis 1.

The numerals 53 and 55 represent ratchet teeth upon the periphery of the ratchet disk 44. Said teeth 53 and 55 are adapted to abut against the pawl 54, also swingingly carried by the stud 52.

Figure 3:
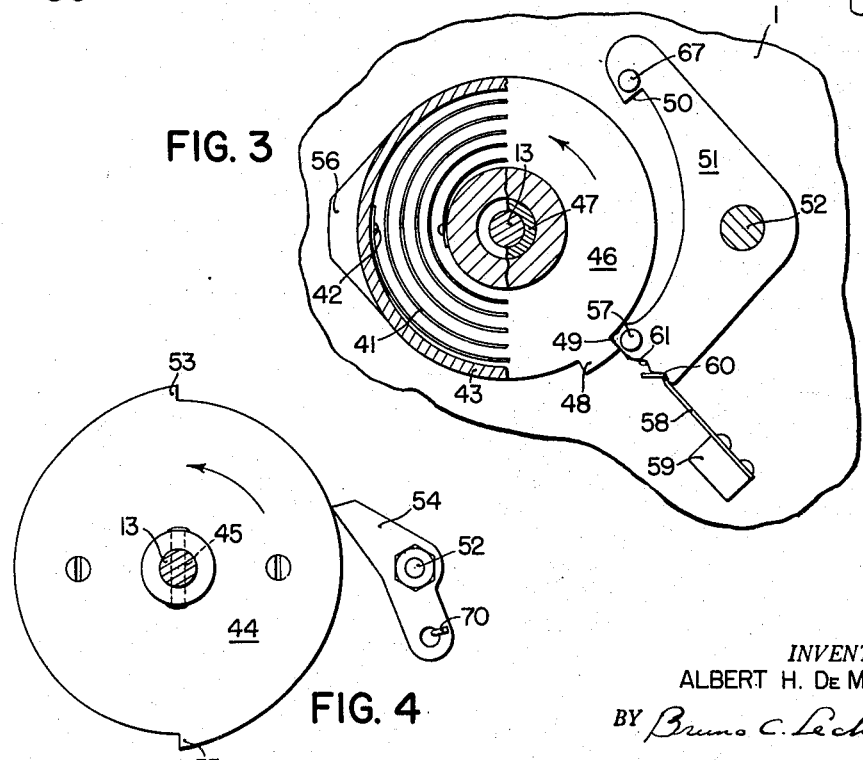
Figure 3 is a fragmentary view in section taken along the planes indicated by the arrows 3—3 of Figure 2.

Disposed upon the outer periphery of the control disk 46 is the cam portion 56 adapted to engage the pin 57 carried by the escapement pawl 51, swinging said escapement pawl 51 in a counterclockwise direction as the parts are viewed in Figure 3. The numeral 58 indicates a leaf spring secured to the abutment 59 fast with the chassis 1. Said leaf spring has a terminal portion adapted to selectably seat itself within the notches 60 or 61 disposed in an extremity of the escapement pawl 51.

A plurality of elongated bolts 62, in cooperation with sleeves 63 and nuts 64, serve to hold the chassis 1 and the insulating plate 7 in fixed relationship with one another. It will be understood, of course, that any desired number of insulating plates 7, spaced apart by sleeves 63, may be carried by said bolts 62, each of which plates 7 may have associated therewith the conductors 4—4, 5—5, conductors 6, spring-pressed pins 9, conducting disk 10 and contacting fingers 11.

The numeral 65 indicates a pin carried by the armature 14 of the electromagnet 12, which pin 65 carries the link 66, which through the pin 15 connects with the lever 18.

The numeral 67 indicates a pin carried by the escapement pawl 51 at the end of said pawl opposite to the pin 57. The numeral 68 indicates a plate having a shouldered portion for limiting movement of the lever 12 in a counterclockwise direction as the parts are viewed in Figure 1. The numeral 89 indicates a sleeve for holding the pawl 54 in proper spaced relationship with the escapement pawl 51. A coil spring 70 reacting between the pawls 54 and 51 urges the pawl 54 at all times against the periphery of the ratchet disk 44, whereby to limit reverse rotation of said disk to the peripheral distance from tooth 55 to tooth 53 or from tooth 53 to tooth 55, though permitting a complete rotation of said disk 44 in the forward direction.

The cooperation of the above described instrumentalities will now be described. For convenience, this cooperation will be described in connection with a washing process or program.

The clothes to be washed are located within a washer and at the beginning of the washing process the controller shaft 13 will be in such a position that finger 11 rests upon the particular contact 5 that corresponds to the first step of the first stage of the program and the mark 3 on the knob 2 points to "Start."

Upon energization of the solenoid 12, which may be accomplished by means not illustrated and not forming part of the present invention, the armature 14 will be drawn to the right as the parts are viewed in Figure 1, moving the lever 18 in a clockwise direction, rotating the ratchet plate 20 and the parts attached thereto one step in advance. Upon deenergization of the solenoid 12 the spring 25 will return the lever 18 in a counterclockwise direction into engagement with the stop plate 68. The detent pawl 27 will prevent any backward movement of the ratchet plate 20 at this time. This rotation of the ratchet plate 20 will advance the various fingers 11—11 associated with the plurality of sets of contacts 5—5 (only one finger 11 and one set of contacts being illustrated). The new connections through the contacts 5—5 will cause the energization of devices (not illustrated) which cause the thing to take place which is appropriate to that step of the procedure. The first step may, for example, be the opening of a water valve or the selection of a temperature at which the water is to enter the washer. After the lapse of an appropriate interval another impulse is given to the magnet 12, which will advance the shaft 13 and the members attached thereto through another increment and a new set of circuits will be established, which will cause an appropriate set of actions to take place. The pawl 27 will prevent the spring 41 from moving parts backwardly until the time for such action arrives.

The engaging relationship of pawls 22 and 27 with the ratchet plate 20 is controlled by means of the solenoid 30. When said electromagnet 30 is energized the armature 31 will be drawn inwardly against the tension of the spring 32, resulting in a movement of the oscillating ring 35 in a clockwise direction as the parts are viewed in Figure 1. Edges 39 and 40 of said oscillating ring 35 will engage the pawls 27 and 22 respectively, freeing them from the teeth of the ratchet plate 20. This action permits the coil spring 41, which has been put under tension in the advance step-by-step movement of the ratchet wheel 20, to move the cup 43 backwardly until the finger 48 engages the face 49 or face 50 of the escapement pawl 51. Engagement of finger 48 with face 49 or face 50 prevents any further reverse movement of the cup 43.

Figure 4:
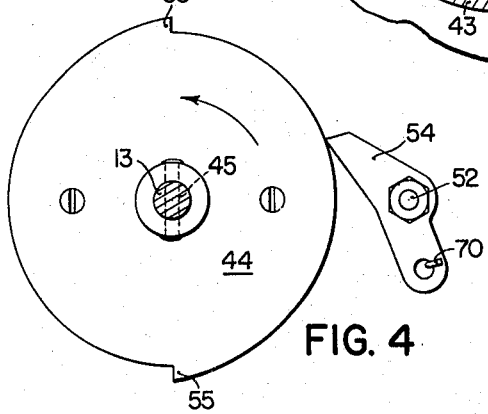
Figure 4 is a sectional view taken along the plane indicated by the arrows 4—4 in Figure 2.

The particular process to be controlled by the illustrated embodiment of the present invention may, as indicated above, comprises a plurality of stages, each of which may consist of one or more steps, and it may be desirable to repeat a stage before proceeding to the next stage, such as performing a sudsing stage one or more times before continuing to the rinsing stage. The teeth 53 and 55 of the ratchet disk 44 (Fig. 4) are adapted to engage the pawl 54. Since the ratchet disk 44 is fast with the control disk 46, one or the other of the teeth 53 and 55, by reason of its engagement with the pawl 54, limits backward movement of the ratchet disk 44 and control disk 46. Once a tooth 53 or 55, in the forward rotation of the disk 44, has passed the pawl 54, only that portion of a revolution of the ratchet disk 44 that lies between that tooth and the pawl 54 can be repeated in that particular program. There may be as many ratchet teeth on the disk 44 as there are stages in the process to be controlled. In the illustration here given there are but two stages represented. As noted above, one stage may represent a washing or sudsing operation (including, for example, the steps comprising the admission of water to the washer at the proper temperature, the admission of soap or other detergent, perhaps the admission of steam, the agitation of the washer for a fixed length of time, and the opening of a discharge valve to permit the escape of dirty water from the washer), and the other stage may represent a rinsing operation.

After there have been sufficient repetitions of one stage of the program, that is, for example, after there have been sufficient repetitions of the sudsing treatment, the release solenoid 30 will not be operated and the next impulse on the solenoid 12 will therefore carry the ratchet plate 20 onto a new set of contacts not previously engaged, and the tooth 55 will now pass the pawl 54. This may be the beginning of a rinsing treatment, and in that event successive steps of the program controller may result in the control of circuits which will close the discharge valve of the washer, add the proper amount of water at the proper temperature, cause the washer to be agitated for the proper length of time, and thereafter open the discharge valve of the washer, allowing the spent rinsing water to escape. Some agency (not illustrated), either manual or automatic, will then determine whether there shall be another rinsing treatment, and in the event that the rinsing treatment is to be repeated will cause the operation of the release solenoid 30, resulting in the lifting of the pawls 22 and 27, allowing the ratchet plate 20 and the shaft 13 to be moved backward by the spring 41. As the tooth 55 (Fig. 4) has now passed the pawl 54, it will be clear that the amount of backward movement is determined by the angle through which the tooth 55 must move to contact the pawl 54. Therefore releases of the disk 44 by action of the solenoid 30 at this time will result only in repetitions of the rinsing treatment and no further sudsing treatment is permitted during the program under consideration.

When any program to be controlled is completed the shaft 13 and all the parts keyed to it will have made one complete revolution. To allow the shaft 13 to continue rotating in a clockwise direction as the parts are viewed in Figure 1, the present invention provides for periodic relief of the tension of the spring 41 during each complete revolution of the shaft 13.

By referring to Figure 3 it will be noted that the cam 56 on the periphery of the cup 43 is adapted to engage pin 57 or pin 67 on the escapement pawl 51. As the cam 56 advances in a counterclockwise direction as the parts are viewed in Figure 3 it will first contact the pin 57, rocking the escapement pawl 51 in a counterclockwise direction, whereby the swinging end portion of the leaf spring 58 will be disposed within the notch 61. This rocking movement of the escapement pawl 51 will free the face 49 from the path of the finger 48 and the spring 41 will start to uncoil, moving the control disk 46 and the inner anchorage of the spring 41 until said finger 48 strikes the face 50, which was rocked into the path of said finger when the face 48 was rocked out of its path. As the cam 56 is carried around further in its advancing movement, that is—in a counterclockwise direction as the parts are viewed in Figure 3, it will engage the pin 67, swinging the escapement pawl 51 in a clockwise direction, whereby the swinging end portion of the leaf spring 58 will be disposed within the notch 60 of the pawl 51. The clockwise movement of the escapement pawl 51 will remove the face 50 from the path of the finger 48, permitting the spring 41 to unwind, moving the control disk 46 and the inner anchorage of the spring 41 until said finger again engages the face 49 of the escapement pawl 51. As explained above, any stage may be repeated one or more times during a program, but at the end of that program the spring 41 will have been restored to its original state of tension. The result is thus accomplished that the spring 41 is maintained at all times under sufficient tension to return the shaft 13 to the starting point of any stage of the program. It is also assured that the tension of the spring 41 will not increase to a point where the shaft and its contacts will be returned too violently.

Though in the illustrated embodiment of the present invention the oscillatable cup 43 is shown as provided with only one cam 56, there may, of course, be several of said cams distributed around the periphery of said control cup. The pins 57 and 67 will be so spaced that any one of said cams 56 will engage both of said pins before the next succeeding cam engages either of said pins. Thus the spring 41 may be partly unwound at any two points in a revolution of the control disk 46 or any multiple of two points in a revolution of said disk 46. Therefore the tension of the spring 41 may be kept always within a working range sufficient to positively turn the shaft 13 backward without danger of creating an objectionable impact of tooth 53 or tooth 55 against the pawl 54.

While the present invention has been described with particular reference to the controlling of electric circuits in connection with the operation of a washing machine, it will be understood that the invention is not limited thereto but is applicable to the control of other cyclic processes. Furthermore, the shaft 13, instead of controlling electric contacts, may control mechanical or other instrumentalities to inaugurate and govern the steps and/or stages of a cyclic process.

Though a preferred embodiment of the present invention has been described in detail, many modifications will occur to those skilled in the art. It is intended to cover all such modifications that fall within the scope of the appended claims.

What is claimed is—

1. In a step by step controller, in combination, a support, a rotatable member having circumferentially placed notches carried by said support, a pawl adapted to advance said member step by step, a spring connected to said member and tensioned as the member advances, a holding pawl preventing said member turning backwards, an anchorage for the other end of said spring, means adapted to hold said anchorage against rotation, a cam carried by said member adapted to release the holding means when said member has advanced through a predetermined angle permitting the spring to cause the anchorage to follow the member through a fixed angular distance after which the anchorage member reengages the holding means, means that allow said member to be turned back by the spring to a predetermined position that has already been passed, said last named means including a pawl lifter that disengages both pawls, a notched disc carried by the member, and a stop pawl engaging one of said notches as the spring draws the member backward.

2. In a step by step controller, in combination, a support, a rotatable member having circumferentially placed notches carried by said support, a pawl adapted to advance said member step by step, a spring connected to said member and tensioned as the member advances, an escapement pawl preventing said member turning backwards, an anchorage for the other end of said spring, means adapted to hold said anchorage against rotation, a cam carried by said member adapted to rock the escapement pawl when said member has advanced through a predetermined angle permitting the spring to cause the anchorage to follow the member through a fixed angular distance after which the anchorage member reengages the escapement pawl, means that allow said member to be turned back by the spring to a predetermined position that has already been passed, said last named means including a pawl lifter that disengages both pawls, a notched disc carried by the member, and a stop pawl engaging one of said notches as the spring draws the member backward.

3. In a step by step controller, in combination, a rotatable member, a ratchet disc containing equally spaced teeth carried by the rotatable member, means to move the rotatable member step by step in a forward direction, a cam containing a few spaced notches also carried by the rotatable member, a spring connected to the rotatable member tending to move the member in reverse direction, a pawl engaging the ratchet disc to normally prevent such reverse movement of the member, a second pawl which engages one of the notches on the cam only when the first named pawl is lifted allowing the spring to move the member in reverse direction, an anchorage for the other end of said spring, an over-wind protection for said spring permitting the anchorage to move predetermined distances to partly release the spring tension upon the continued forward movement of the member, a cam carried by the member to bring the over-wind protection into action at definite points in the forward travel of the member.

ALBERT H. DE MOSS.

REFERENCES CITED

The following references are of record in the file of this patent:

UNITED STATES PATENTS

| Number | Name | Date |
|---|---|---|
| 855,039 | Baron | May 28, 1907 |
| 1,365,701 | Kliesrath et al. | Jan. 18, 1921 |
| 1,891,101 | LeCount | Dec. 13, 1932 |
| 2,009,383 | Blume | July 30, 1935 |
| 2,046,433 | Slye | July 7, 1936 |
| 2,106,042 | Stark | Jan. 18, 1938 |
| 2,165,719 | Munnich et al. | July 11, 1939 |
| 2,227,133 | Hall | Dec. 31, 1940 |
| 2,281,262 | Breitenstein | Apr. 28, 1942 |
| 2,324,321 | Peters | July 13, 1943 |